(12) United States Patent
Krestyannikov

(10) Patent No.: US 9,756,234 B2
(45) Date of Patent: Sep. 5, 2017

(54) CONTRAST DETECTION AUTOFOCUS USING MULTI-FILTER PROCESSING AND ADAPTIVE STEP SIZE SELECTION

(71) Applicant: Intel Corporation, Santa Clara, CA (US)

(72) Inventor: Evgeny Krestyannikov, Tampere (FI)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 14/334,910

(22) Filed: Jul. 18, 2014

(65) Prior Publication Data

US 2016/0021295 A1 Jan. 21, 2016

(51) Int. Cl.
*H04N 5/232* (2006.01)
*G02B 7/36* (2006.01)

(52) U.S. Cl.
CPC .......... *H04N 5/23212* (2013.01); *G02B 7/36* (2013.01)

(58) Field of Classification Search
CPC .............................. H04N 5/23212; G02B 7/36
See application file for complete search history.

(56) References Cited

U.S. PATENT DOCUMENTS

| 7,505,075 B2 * | 3/2009 | Watanabe | H04N 5/23212 348/349 |
| 8,238,681 B2 * | 8/2012 | Samurov | H04N 5/23212 348/352 |
| 2007/0212049 A1 * | 9/2007 | Guroglu | G02B 7/346 396/127 |
| 2010/0309364 A1 * | 12/2010 | Brunner | H04N 5/23212 348/345 |

* cited by examiner

*Primary Examiner* — James Hannett
*Assistant Examiner* — Padma Haliyur
(74) *Attorney, Agent, or Firm* — Green, Howard & Mughal LLP

(57) ABSTRACT

Techniques related to contract detection autofocus for imaging devices and, in particular, to contrast detection autofocus using multiple filters to generate adaptive step sizes are discussed. Such techniques may include determining a ratio of filter responses for filters applied to a portion of a scene, generating a distance from focus based on the ratio, and determining a lens position movement based on an adaptive step size generated using the distance from focus and a confidence level associated with the distance from focus.

20 Claims, 8 Drawing Sheets

CONTRAST DETECTION AUTOFOCUS USING MULTI-FILTER PROCESSING AND ADAPTIVE STEP SIZE SELECTION

BACKGROUND

In digital cameras, autofocus may be used to focus on an object of interest. Such digital cameras may be provided as stand alone devices or they may be integrated into a multi-purpose device such as a smartphone or the like. In various implementations, digital cameras may use contrast based autofocus. For example, implementing contrast based autofocus may include measuring contrast of images (or portions thereof) attained via an image sensor and using the image having the greatest contrast as best focus (with the assumption being in focus images have higher contrast than out of focus images). Such passive contrast based autofocus systems have inherent limitations including neither the location of peak focus nor the direction and offset to peak focus being known based on a single contrast measurement.

Instead, the digital camera may scan through a range of positions before a maximum contrast measurement is found. Such techniques make autofocus convergence times relatively slow (e.g., 5-10 iterations on average) and autofocus convergence susceptible to camera and/or object motion, lighting conditions, and scene contrast. Furthermore, such autofocus techniques are susceptible to overshoots (e.g., the camera changing lens position past the position of focus to obtain the information needed to determine the position of focus as performed in contrast based autofocus). Such overshoots may be seen as lens oscillations around the optimal in-focus position and they may take time and reduce quality in video capture In other implementations, digital cameras may use phase detection autofocus. Phase detection autofocus may improve focusing speed and reduce overshoot but such systems may require more costly and sophisticated sensors (e.g., sensors including phase autofocus pixels and associated circuitry). Such systems may therefore increase the cost of digital cameras and digital camera modules integrated into multi-purpose devices. Furthermore, phase autofocus systems may be not be reliable for all scenes and in all conditions.

Therefore, current contrast based autofocus techniques may provide relatively slow focus and problems during video capture and current phase autofocus systems may be relatively expensive and sometimes unreliable. Such problems may become critical as the use of digital cameras and, particularly, small sized digital cameras, cameras integrated into smartphones, and mass produced digital cameras becomes more widespread

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
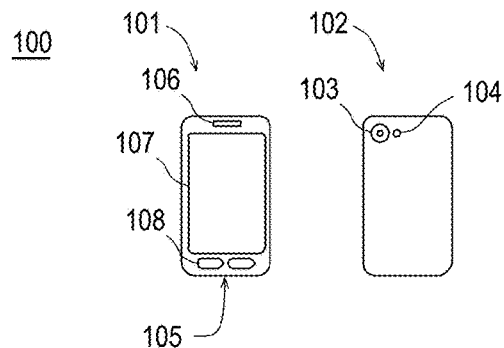
FIG. 1 is an illustrative diagram of an example imaging device for providing contrast detection autofocus.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to providing contrast detection autofocus for imaging devices and, in particular, for generating a lens position movement based on a ratio of responses (e.g., focus values) from different filters applied to image data.

As described above, digital cameras (e.g., cameras or cameras integrated within devices such as smartphones or the like) may perform autofocus. In some instances, a digital camera may use contrast detection autofocus, which may be implemented using the image sensor of the digital camera (e.g., without additional sensors and/or phase detection pixels interspersed within the image sensor) and may be based on measuring contrast or sharpness of the image data with best focus being associated with the lens position having the highest contrast image data.

In some embodiments discussed herein, a ratio of a response (e.g., a focus value or a sharpness value) from a filter and a second response from a second filter may be determined for one or more regions of interest of a scene or for the entire scene or the like. A distance from focus and a confidence level associated with the distance from focus may be determined. For example, the distance from focus may be based on the ratio, the response, and/or the second response. In some examples, the distance from focus may also be based on changes in the ratio, the response, and/or the second response. For example, the responses and ratio of the responses may be determined at a first lens position and, after a lens move, the responses and ratio of the responses may be determined again at a second lens position. The changes of the responses and the ratio (e.g., the delta between after and before the lens movement) may be used to determine the distance from focus. Furthermore, the confidence level may be based on one of the responses and the ratio for example. A lens position movement may be determined based on the distance from focus and the confidence level. For example, a product of a reference step size and a multiplier that varies based on the distance from focus, the confidence level, and the current lens position may provide the lens position movement. The imaging device (e.g., digital camera) may focus based on the lens position movement by moving a lens according to the lens position movement. Such operations may be repeated any number of times until focus is achieved. In some examples, a single lens movement subsequent to the aforementioned lens movement (e.g., the lens movement used to attain the deltas) may provide focus for the imaging device. Such techniques may provide fast and reliable autofocus.

FIG. 1 is an illustrative diagram of an example imaging device 100 for providing contrast detection autofocus, arranged in accordance with at least some implementations of the present disclosure. As shown in FIG. 1, in an embodiment, imaging device 100 is a smartphone. As shown, imaging device 100 may include a front 101 and a back 102. In some examples, as shown, the back 102 of imaging device 100 may include an integrated camera 103 (e.g., including a lens, an aperture, and an imaging sensor) and a flash 104 (e.g., a flash or flash light such as a supercapacitor LED or the like). Also as shown, the front 101 of imaging device 100 may include a speaker 106, a display 107, and one or more buttons 108. Furthermore, imaging device 100 may include a microphone 105, which in the illustrated example is shown on the bottom of imaging device 100. Such devices may provide for a variety of uses of imaging device 100.

The described components of imaging device 100 may be incorporated in any suitable manner. For example, camera 103 and flash 104 may be incorporated on the front 101 of imaging device 100. In some examples, both a front and back camera and flash may be incorporated into imaging device 100. Furthermore, in some examples, display 107 may be a touch screen display such that a user may interact with imaging device 100 via commands initiated via display 107 such as tapping display 107 to indicate an object or region of interest for focusing. As discussed, in some examples, imaging device 100 may include each of the described components. In other examples, imaging device 100 may not include one or more of the described components. For example, imaging device 100 may not include speaker 106, display 107, and/or microphone 105. Furthermore, the discussed components may incorporated into any form factor device such as the illustrated smartphone, a dedicated camera, an ultrabook, a laptop, a tablet, or any other device discussed herein. For example, dedicated cameras may include point and shoot cameras, interchangeable lens system cameras, mirror-less cameras, digital single-lens reflex (DSLR) cameras, and so on. As discussed, camera 103 of imaging device 100 may be focused using contrast detection autofocus.

Figure 2:
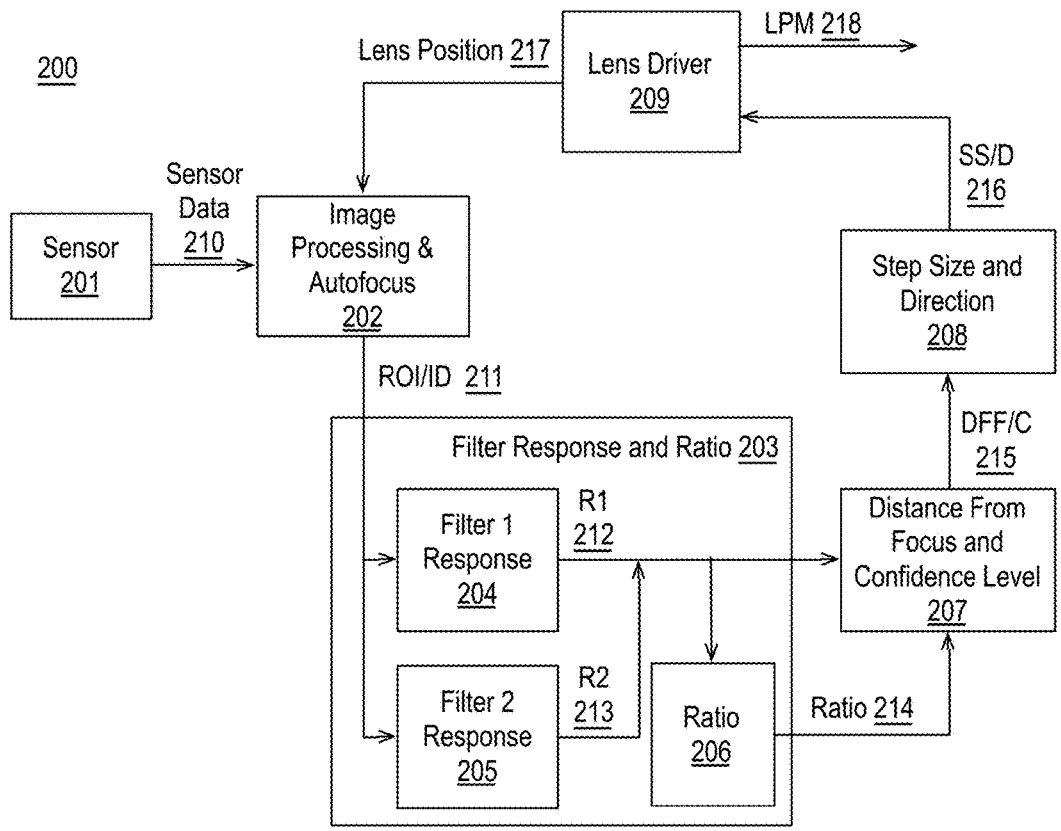
FIG. 2 is an illustrative block diagram of an example contrast detection autofocus system.

FIG. 2 is an illustrative block diagram of an example contrast detection autofocus system 200, arranged in accordance with at least some implementations of the present disclosure. In some examples, contrast detection autofocus system 200 may be implemented via imaging device 100. As shown in FIG. 2, contrast detection autofocus system 200 may include a sensor 201, an image processing and autofocus module 202, a filter response and ratio module 203, a distance from focus and confidence level module 207, a step size and direction module 208, and a lens driver 209. Also as shown, filter response and ratio module 203 may include a filter one (1) response module 204, a filter two (2) response module 205, and a ratio module 206. In various examples, any of modules 202-209 of contrast detection autofocus system 200 may be implemented via one or more central processing unit(s), image processing units, graphics processing unit(s), and/or as a system on a chip as is discussed further herein.

As shown in FIG. 2 image processing and autofocus module 202 may receive sensor data 210 from sensor 201. Sensor data 210 may be any suitable data (e.g., implemented via electrical signals or the like) associated with a scene or frame being viewed by contrast detection autofocus system 200 and/or imaging device 100. In some examples, sensor data 210 may be temporarily stored in a memory of contrast detection autofocus system 200. Image processing and autofocus module 202 may receive sensor data 210 from sensor 201 or memory and may generate region(s) of interest and image data (ROI/ID) 211. For example, image processing and autofocus module 202 may generate region(s) of interest and image data 211 in real-time and on-the-fly.

For example, image data of region(s) of interest and image data 211 may include image data for the region or regions of interest for which focus is desired. In some examples, a single region of interest may be used and in other examples multiple regions of interest may be used. In still other examples, region(s) of interest may not be used and instead the entirety or a portion of a scene may be used. In such examples, region(s) of interest and image data 211 may not include data defining a region of interest for example. In any case, image data of region(s) of interest and image data 211 may include any suitable image data such as grayscale image data associated with intensities measured or attained via sensor 201. In some examples, no separate and full images or image planes may be available and instead a pixel stream from sensor 201 (e.g., of image data of region(s) of interest and image data 211) may be processed on-the-fly (e.g., image processing and autofocus module 202 may have only one or two lines of image data at a time). Similarly, images or image data as described herein may include a stream of data associated with an image or region of interest or the like (e.g. without full images being fully available at any time). For example, image processing and autofocus module 202 as implemented via an image signal processor (ISP) may receive sensor data 210 and provide region(s) of interest and image data 211 (or portions thereof) on-the-fly and subsequent modules as described herein may process data on-the-fly without attaining full image data or the like.

Figure 3:
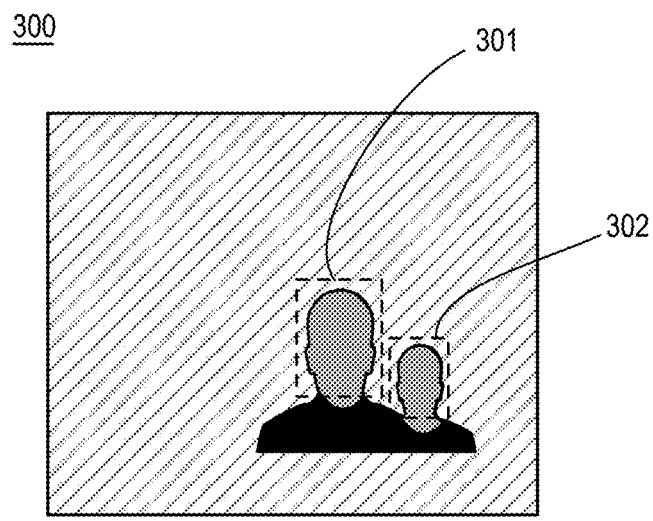
FIG. 3 illustrates an examples scene including example regions of interest.

As discussed, image processing and autofocus module 202 may generate a region of interest or multiple regions of interest within a scene. FIG. 3 illustrates an examples scene 300 including example regions of interest 301, 302, arranged in accordance with at least some implementations of the present disclosure. FIG. 3 illustrates an example scene 300 such as a scene that a user is photographing or videoing. As shown, scene 300 may include regions of interest 301, 302 such that it may be desirable for imaging device 100 and/or contrast detection autofocus system 200 to focus on regions of interest 301, 302 and/or for imaging device 100 and/or contrast detection autofocus system 200 to determine, if regions of interest 301, 302 correspond to different distances from imaging device 100, whether to focus on region of interest 301 or region of interest 302 (e.g., based on an object in regions of interest being closer, larger, closer to a center of scene 300, or the like). Regions of interest 301, 302 may be determined via image processing and autofocus module 202 or another module of imaging device 100 and/or contrast detection autofocus system 200 using any suitable technique or techniques. For example, regions of interest 301, 302 may be determined based on object detection or recognition techniques or face detection techniques or the like. In other examples, a user may tap display 107 to indicate a region of interest or a region of interest may be a default position of scene 300 such as the center of the scene or the like. Although illustrated with two regions of interest, any number of regions of interest may be used.

Returning to FIG. 2, region of interest data of region(s) of interest and image data 211 may define region(s) of interest in any suitable manner such as providing a boundary of the region of interest or a position and dimensions of the region of interest or the like. Furthermore, as shown, in some examples, image processing and autofocus module 202 may provide region(s) of interest and image data 211. In other examples, image processing and autofocus module 202 may only provide image data associated with the region(s) of interest (e.g., such that the boundaries of the region(s) of interest are known based on the provided image data or not relevant to further processing). For example, image processing and autofocus module 202 may provide image data only for the regions of interest to filter response and ratio module 203. Image processing and autofocus module 202 may provide region(s) of interest and image data 211 to filter response and ratio module and/or to a memory of contrast detection autofocus system 200.

Filter response and ratio module 203 may receive region(s) of interest and image data 211 from image processing and autofocus module 202 or from memory. For example, filter response and ratio module 203 may receive region(s) of interest and image data 211 via filter one response module 204 and filter two response module 205. Filter one response module 204 may generate a first response (R1) 212 by implementing a filter to image data of region(s) of interest and image data 211. Furthermore, filter two response module 205 may generate a second response (R2) 213 by implementing a filter (e.g., a filter different than the filter implemented by filter one response module 204) to image data of region(s) of interest and image data 211. For example, first response 212 and second response 213 may be focus values, contrast values, sharpness values, or the like determined based in part on applying filters to image data. In some examples, the filters are band pass filters with different pass bands as is discussed further herein. In some examples, image data may be transformed to a frequency domain (e.g., via a discrete cosine transform or the like) and the filter may be applied in the frequency domain. Furthermore, the response (e.g., focus value or sharpness value) may be determined using standard techniques such as generating a contrast value, contrast measurement, sharpness value, or sharpness value for the image data. As illustrated, in some examples, two filter responses may be used. In other examples, additional filter response modules may implemented additional corresponding filters to determined additional filter responses. In some embodiments, 3, 4, or more filter response modules may be implemented.

Figure 4:
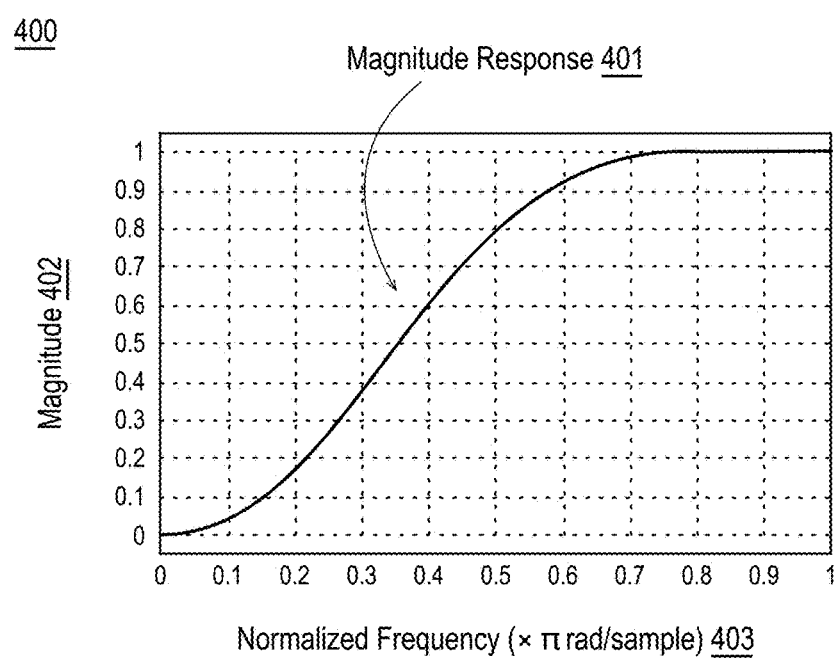
FIG. 4 illustrates an example filter for application to image data.

FIG. 4 illustrates an example filter 400 for application to image data, arranged in accordance with at least some implementations of the present disclosure. As shown in FIG. 4, filter 400 may include a magnitude response 401 as a curve of magnitude 402 plotted against normalized frequency 403. For example, magnitude 402 may be a normalized magnitude and normalized frequency 403 may be a normalized frequency expressed as π rad/sample as shown in FIG. 4. As shown, filter 400 may provide a relatively wide band pass filter with a pass band having cut off frequency of about 0.

Figure 5:
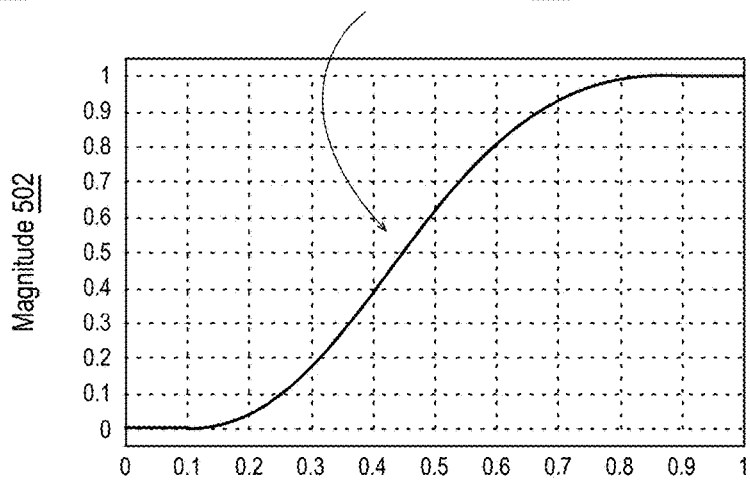
FIG. 5 illustrates an example filter for application to image data.

FIG. 5 illustrates an example filter 500 for application to image data, arranged in accordance with at least some implementations of the present disclosure. As shown in FIG. 5, filter 500 may include a magnitude response 501 as a curve of magnitude 502 plotted against normalized frequency 503. For example, as discussed with respect to filter 400, magnitude 502 may be a normalized magnitude and normalized frequency 503 may be expressed as π rad/sample. As shown in FIG. 5, filter 500 may provide a relatively narrow band pass filter (e.g., as compared to filter 400) with a pass band having cut off frequency of about 0.1.

As shown, filter 400 and filter 500 may provide band pass filters with different pass bands. For example, filter 400 may have a wider pass band than filter 500. Furthermore, filter 400 and filter 500 may enable the analysis of different frequencies in the image content of region(s) of interest and image data 211. For example, filter 400 may include or analyze lower frequency content and filter 500 may include or analyze higher frequency content. For example, filter 400 may provide a relatively wider pass band and may be designed to analyze lower frequency content and filter 500 may provide a relatively narrower pass band and may be designed to analyze higher frequency content. Although embodiments are discussed with respect to the filters 400 and 500, the described may be implemented with any suitable filters. For example, the filters may include low-pass filters or high-pass filters. Furthermore, the implemented pass bands may have any suitable widths such as a normalized frequency width in the range of 0.8 to 0.9, 0.6 to 0.9, or 0.6 to 0.7, or the like. Also, the band pass filters may include any cut off frequencies such as 0 or 0.1 as discussed or cut of frequencies in the range of 0 to 0.1, 0 to 0.2, or 0.1 to 0.3, or the like. As discussed, any number of filters such as 2, 3, 4, or more filters may be used. The filters may also be used in any combination such that effective focusing responses and effective response ratios (as discussed further herein) may be attained for converging imaging device 100 to focus.

Figure 6:
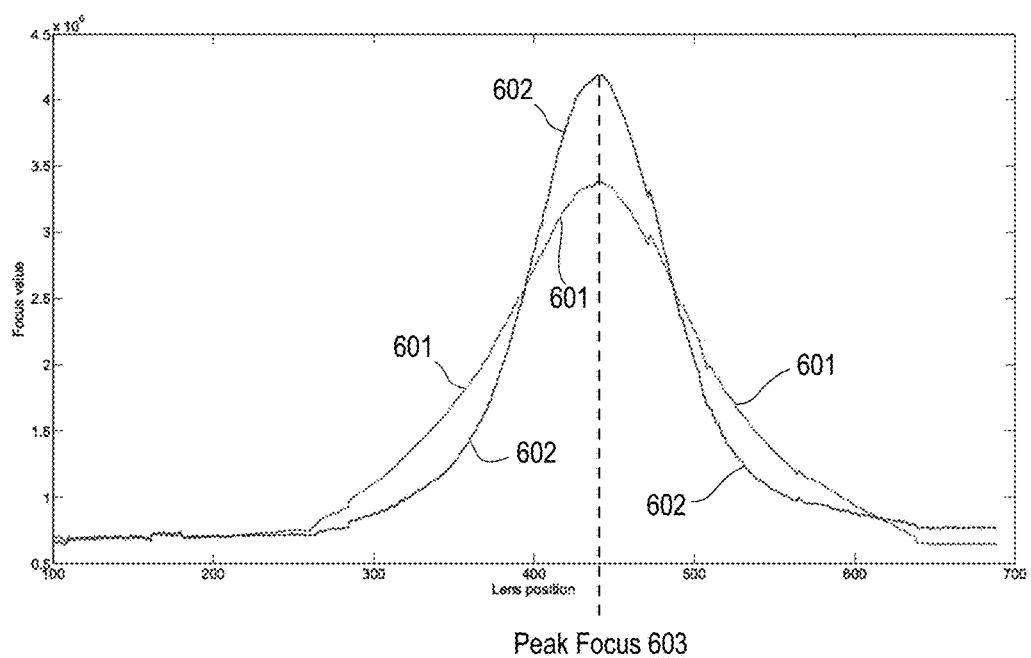
FIG. 6 illustrates a chart of example filter responses.

FIG. 6 illustrates a chart 600 of example filter responses 601, 602, arranged in accordance with at least some implementations of the present disclosure. As shown in FIG. 6, chart 600 includes a plotting of example filter responses (e.g., focus values or sharpness values or the like) at various lens positions (e.g., illustrated as Focus value v. Lens position in chart 600). For example, chart 600 includes sample filter responses for a region of interest of a scene taken at sample lens positions (e.g., position 100 to about position 690) of an example imaging device. For example, chart 600 and chart 700 discussed below include sample data (e.g., filter responses and ratios, respectively) for a region of interest at sample lens positions (e.g., position 100 to about position 690) of an example imaging device. In embodiments discussed herein, such complete charts of data are not available during live focusing. Instead, during focusing, one or more lens positions may be evaluated to determine filter response(s) and/or ratio(s). Based on such information, a distance from focus and a confidence level may be generated and a lens movement may be determined based on the distance from focus and/or the confidence level as is discussed further herein. The lens movement may be determined with the desired outcome of moving closer to a peak focus 603 in only one lens movement or very few lens movements. As shown in chart 600, peak focus 603 may be associated with the peaks of filter responses 601 and 602. As shown, filter 400 (e.g., as shown with respect to filter response 601) has a broader response than filter 500 (e.g., as shown with respect to filter response 602), which has a narrower and more pronounced peak and substantially sharp change around its focus peak. The difference in band widths associated with filter 400 and filter 500 (and thereby different response widths as shown with respect to filter response 601, 602) may be used generate a filter response ratio that is useful in finding peak focus 603 quickly and reliably.

Returning to FIG. 2, as discussed, filter response and ratio module 203 may receive region(s) of interest and image data 211 via filter one response module 204 and filter two response module 205. Also as discussed, filter one response module 204 may generate a first response 212 by implementing a filter to image data of region(s) of interest and image data 211 and filter two response module 205 may generate a second response (R2) 213 by implementing a different filter to image data of region(s) of interest and image data 211. In some examples, filter response one module 204 may apply filter 400 as discussed with respect to FIG. 4 and filter response two module 205 may apply filter 500 as discussed with respect to FIG. 5, although any suitable filters as discussed herein may be used.

As shown, first response 212 and second response 213 may be provided to ratio module 206, which may determine a ratio based on first response 212 and second response 213. For example, ratio module 206 may divide first response 212 by second response 213 (or vice versa) to determine ratio 214. As discussed, in some examples, two filters may be used to determine two filter responses as illustrated. In other examples, additional filter responses may be determined. In such examples, additional ratios may be determined and provided via ratio 214. For example, multiple filter responses may be combined in any manner to determine additional ratios. Filter response and ratio module 213 may transfer first response 212, second response 213, and ratio 214 (and any additional filter responses and/or ratios) to distance from focus and confidence level module 207 and/or to a memory of contrast detection autofocus system 200.

Figure 7:
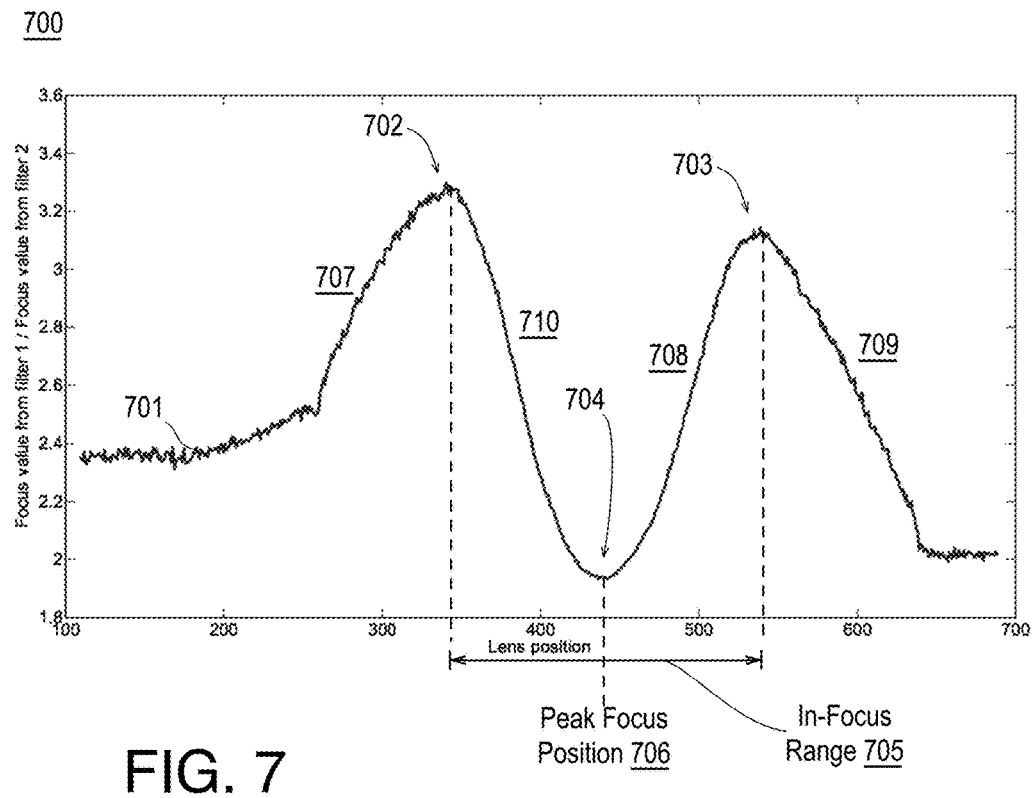
FIG. 7 illustrates a chart of example filter response ratios.

FIG. 7 illustrates a chart 700 of example filter response ratios 701, arranged in accordance with at least some implementations of the present disclosure. As shown in FIG. 7, chart 700 includes sample filter response ratios (e.g., a ratio of the focus value from filter 400 to the focus value from filter 500) for a region of interest of a scene taken at sample lens positions (e.g., position 100 to about position 690) of an example imaging device. In some examples, the ratio may be R, the response (e.g., focus value) from filter 400 may be $F_1$, and the response (e.g., focus value) from filter 500 may be $F_2$ such that the ratio, R, may be $F_1/F_2$, (e.g., $R=F_1/F_2$). In some examples, the effective range of values for ratio R is approximately between 1 and 4. The lower is the ratio, the higher is the likelihood of image to be of lower contrast and/or out-of-focus. As discussed, in embodiments discussed herein, a complete chart as is illustrated with respect to chart 700 is not available during focusing. Instead, ratios at one or more lens positions may be evaluated to determine lens movements for focusing. As shown, filter response ratios 701 as plotted against lens position may have a distinctive shape with two global maximums 702, 703 and a global minimum 704. Furthermore, as shown, filter response ratios 701 may have a distinctive M shape. In some examples, lens positions between global maximums 702, 703 may define an in-focus range 705 and the lens position associated with global minimum 704 may define a best, optimal or peak focus position 706. It is noted that peak focus position 706 corresponds to the lens position of peak focus 603 as shown in FIG. 6. Furthermore, the scene or region of interest is out of focus and far from in-focus if the lens position is outside of global maximums 702, 703 (e.g., outside of in-focus range 705).

Returning to FIG. 2, distance from focus and confidence level module 207 may receive first response 212, second response 213, and ratio 214 from filter response and ratio module 213 or memory. In some examples, as illustrated, distance from focus and confidence level module 207 may receive all of first response 212, second response 213, and ratio 214. In other examples, distance from focus and confidence level module 207 may not receive (e.g., and not use) one of first response 212, second response 213, or ratio 214. Distance from focus and confidence level module 207 may determine a distance from focus and a confidence level (DFF/CL) 215 based on one or more of first response 212, second response 213, ratio 214, a previous first response (e.g., a response from filter 400 based on previous image data), a previous second response (e.g., a response from filter 500 based on previous image data), and/or a previous ratio (e.g. a ratio of the previous first and second responses). For example, the previous image data may be image data for a same region of interest at a different lens position.

For example, as discussed, an imaging device such as imaging device 100 may, for multiple lens positions, determine a first filter response, a second filter response, and a ratio. For example, as is discussed further herein with respect to FIG. 8, imaging device 100 may determine a first filter response, a second filter response, and a ratio at a first lens position, and determine and make a lens movement based on the first filter response, the second filter response, and the ratio. Imaging device 100 may then determine a first filter response, a second filter response, and a ratio at the new lens position. Based on the previous and new lens position data, imaging device 100 may also determine a change in the first filter response, a change in the second filter response, a change in the ratio, and a change in the lens position after the movement (e.g., imaging device 100 may determine deltas for each or some of the described values). Imaging device may then determine and make a lens movement based on some or all of the described data, and the process may be repeated until focus has been achieved.

After each lens movement, for example, distance from focus and confidence level module 207 may determine a distance from focus based on any of the first filter response at the current lens position, the second filter response at the current lens position, the ratio at the current lens position, the current lens position, and one or more previous first filter responses, second filter responses, ratios, and lens positions. In some examples, the distance from focus may be based on ratio 214, first response 212 (e.g., a first response at the current lens position), a change in the first response from a previous first response (e.g., a first response change from a previous first response to the current first response), second response 213 (e.g., a second response at the current lens position), a change in the second response from a previous second response (e.g. a second response change from a previous second response to the current second response), ratio 214, and/or a change in the ratio (e.g., a ratio change from a previous ratio to the current ratio).

The distance from focus may be determined using any suitable technique or techniques. In some examples, the distance from focus may be determined based on an expected or assumed approximation for one or more of filter response ratios 701, filter response 601, and filter response 602 (or portions thereof) and, based on the current values and previous values (e.g., responses, ratios, and/or deltas as discussed), generating a distance from focus based on the approximated curves. In some examples, the distance from focus may be determined in a parametric form as shown in Equation (1):

$$\hat{d} \sim f(F_1, \Delta F_1, F_2, \Delta F_2, \Delta F_{ref}, R_{norm}, \Delta R_{norm}, \Delta l, \Delta l_{ref}) \quad (1)$$

where $\hat{d}$ may be the distance from focus, $F_1$ may be the response from a first filter (e.g., first response 212), $F_2$ may be the response from a second filter (e.g., second response 213), $\Delta F_1$ may be the change in response from the first filter from a previous lens position to the current lens position, $\Delta F_2$ may be the change in response from the second filter from a previous lens position to the current lens position, $\Delta F_{ref}$ may be a reference change in focus response, $R_{norm}$ may be the normalized ratio of the response from the first filter to the response from the second filter (e.g., $R=F_1/F_2-1$), $\Delta R_{norm}$ may be the change in the normalized ratio from a previous lens position to the current lens position, $\Delta l$ may be the change in lens position, $\Delta l_{ref}$ may be the reference change in lens position. For example, $R_{norm}$ may be used in Equation (1) instead of R, because the effective range of $R_{norm}$ may be [0:3] whereas the effective range of R may be [1:4]. The use of such a normalized range may simplify the calculations as discussed further herein. In other examples, the response ratio, R, and/or a change in response ratio (e.g., $\Delta R$) may be used in Equation (1).

Using filter response ratios 701, filter response 601, and filter response 602 as example curves (please refer to FIGS. 6 and 7), a movement from lens position 260 to lens position 300 may indicate the imaging device is still far from focus for example. In such an example, moving from lens position 260 to lens position 300, the filter response ratio increased substantially and filter response 601 and filter response 602 also increased (indicating the imaging device is outside of in-focus range 705 and to the left of global maximum 702; whereas if filter response ratio increased and filter response 601 and filter response 602 had increased, the ratio may have increased along the curve within in-focus range 705 such as is shown from lens position 480 to lens position 520). In another example, a movement from lens position 350 to lens position 400 may indicate the imaging device is in focus and may be moved to better focus). For example, moving from lens position 350 to lens position 400, the filter response ratio decreases substantially and filter response 601 and filter response 602 also increase substantially, indicating the lens position is within in-focus range 705 and to the left of peak focus position 706). Similarly, other portions of filter response ratios 701, filter response 601, and filter response 602 may be used to approximate a distance to focus.

As discussed, filter response ratios 701, filter response 601, and filter response 602 may be examples attained via the evaluation of a scene at available lens positions. Furthermore, as discussed, such data may not be available during camera focusing operations. However, such curves may provide guidance in determining the distance from focus of distance from focus and confidence level 215. FIG. 7 illustrates example regions 707-710 of filter response ratios that may be indicative of certain focusing characteristics. For example, large current filter response ratios (not labeled but proximate to global maximums 702, 703) may indicate an improved focus position may be available. Furthermore, a large change in filter response ratio from a previous position to a current position (also not labeled) may indicate proximity to global maximums 702 and/or the global minimum 703.

In some examples, a positive change (and, in some cases, a large positive change) in filter response ratio (e.g., in region 707 of filter response ratios 701) along with a positive change in first and/or second filter responses (please refer to FIG. 6) may indicate peak focus is to the right of the current lens position and that the imaging device is currently out of focus (e.g., outside of in-focus range 705). In some examples, a positive change (and, in some cases, a large positive change) in filter response ratio (e.g., in region 708 of filter response ratios 701) along with a negative change in first and/or second filter responses (please refer to FIG. 6) may indicate peak focus is to the left of the current lens position but that the imaging device is currently within in-focus range 705 (e.g., in focus, although a better focus position may be available). A negative change (and, in some cases, a large positive change) in filter response ratio (e.g., in region 709 of filter response ratios 701) along with a negative change in first and/or second filter responses (please refer to FIG. 6) may indicate peak focus is to the left of the current lens position and that the imaging device is currently out of focus (e.g., outside of in-focus range 705). A negative change (and, in some cases, a large positive change) in filter response ratio (e.g., in region 710 of filter response ratios 701) along with a positive change in first and/or second filter responses (please refer to FIG. 6) may indicate peak focus is to the right of the current lens position but that the imaging device is currently within in-focus range 705. Other distance from focus information may be determined based on the discussed first and second filter responses. Using such information, Equation (1) may be used to determine a distance from focus based on heuristic functions, weighted parametric functions, linear segments associated with the discussed curves (e.g., linear approximations of segments of the discussed curves), decision functions, decision trees, or the like.

In some examples, the distance from focus $\hat{d}$, may be determined as follows. For example, when the lens is within the in-focus range 705, distance from focus, $\hat{d}_{in}$, the distance from focus may be determined based on a normalized ratio, the response from a first filter, a reference change in lens position, the change in response from the first filter, a change in response from a second filter, a reference change in focus response, and a change in lens position. For example, when the lens is within an in-focus range, distance from focus, $\hat{d}_{in}$, may be determined as shown in Equation (2):

$$\hat{d}_{in} = \frac{1}{2} \times \frac{\left(R_{norm} \times F_1 \times \Delta l_{ref} \times \frac{\Delta F_1}{\Delta F_2}\right) - \Delta F_{ref} \times \Delta l}{\Delta F_{ref}} \quad (2)$$

where $\hat{d}_{in}$ may be the estimate for distance from focus, $\hat{d}$, when the object is in-focus (e.g., within in-focus range 705).

For example, when the lens is out of focus (e.g., in one of ranges 707, 709 or a far from focus at about lens positions 100-250 or greater than 600, please refer to FIG. 7), the distance from focus may be determined based on a change in response from a first filter, a change in response from a second filter, a normalized ratio, and a reference change in lens position. For example, when the lens out-of-focus, the distance from focus may be determined as shown in Equation (3):

$$\hat{d}_{out} = \left(\max\left(0, \frac{\Delta F_1}{\Delta F_2} - 1\right) + \left(1 + R_{norm} * \sqrt{\frac{\Delta F_1}{\Delta F_2}}\right)\right) * \Delta l_{ref} \quad (3)$$

where $\hat{d}_{out}$ is the estimate for distance from focus, $\hat{d}$, when the object is out-of-focus.

As discussed, distance from focus and confidence level module 207 may determine a confidence level associated with the distance from focus. In some examples, the confidence level may be based on first response 212, a first response change from a previous first response to the first response (e.g., a first response delta), and ratio 214 (e.g., via a normalized ratio as discussed herein). For example, the confidence level may be determined in a parametric form based on Equation (4):

$$\theta \sim f(F_1, \Delta F_1, R_{norm}) \quad (4)$$

where $\theta$ may be the confidence level in the range [0:1]. For example, the confidence level may be low when $F_1$ and/or $\Delta F_1$ are low since small values and small changes in the response of the first filter (e.g., filter response 601) may be difficult to separate from noise. In another example, a larger filter response ratio may indicate a higher confidence level since a larger filter response ratio (e.g., global maximums 702, 703) may indicate the imaging device is close to in-focus. Similarly, a smaller filter response ratio, $R_{norm}$, may indicate a lower confidence level since a smaller filter response ratio may indicate the imaging device is very far out of focus. In some examples, a large filter response ratio and a large change in response from the first filter from a previous lens position to the current lens position (e.g., $\Delta F_1$) may provide the largest (e.g., equal to 1) confidence level. In some examples, the confidence level may be proportional to any or all of $F_1$, $\Delta F_1$, and $R_{norm}$. The confidence level may be any suitable value. Distance from focus and confidence level module 207 may transfer distance from focus and a confidence level 215 to step size and direction module 208 and/or memory.

Step size and direction module 208 may receive distance from focus and a confidence level 215 from distance from focus and confidence level module 207 or memory and step size and direction module 208 may generate a step size and a direction (SS/D) 216 based on distance from focus and a confidence level 215. For example, step size and direction 216 may indicate a step size and a direction for a move to a next lens position. In some examples, step size and direction 216 may be adaptively determined by generating a multiplier based on the distance from focus, the confidence level, and the current lens position and determining a product of the multiplier and a reference step size. In some examples, the step size and direction may be determined as shown in Equation (4):

$$\Delta l_{next} = k \times \Delta l_{ref} \quad (4)$$

where $\Delta l_{next}$ may be the step size and direction (e.g., the next step), k may be the multiplier or a coefficient, and $\Delta l_{ref}$ may be a reference step size. The reference step size, $\Delta l_{ref}$ may be determined via contrast detection autofocus system 200 (such as via image processing and autofocus module 202) based on the lens position range (i.e. lens range between the target at infinity position, and target at close-up position), focus mode and tuning preferences. The multiplier, k, may be determined adaptively based on the distance from focus, $\hat{d}$, the confidence level, $\theta$, and the current lens position. For example, the multiplier, k, may aggregate the current status of the discussed autofocus regarding characteristics of the focus peak, distance from focus, and confidence level and be in the range of 0.75 to 4. For example, distance focus peaks with high confidence levels may provide for larger multipliers (and therefore a large step size, $\Delta l_{next}$). For lower confidence levels or if the current lens position is very close to in-focus, the multiplier, k, will be small providing for a large step size, $\Delta l_{next}$. Step size and direction module 208 may transfer step size and direction 216 to lens driver 209 and/or to a memory.

Lens driver 209 may receive step size and direction 216 from step size and direction module 208 or memory and lens driver 209 may translate the step size and direction to a signal or motor count or the like for driving a lens to the new position via lens position movement (LPM) 218. Lens position movement 218 may be any suitable data for driving a lens position such as a motor count and direction, a relative distance move, a lens position to drive to, or the like. Furthermore, lens driver 209 may provide the current lens position (e.g., lens position 217) to image processing and autofocus module 202 for use in processing.

Contrast detection autofocus system 200 may evaluate the focus at the new lens position (e.g., based on contrast detection) to determine whether the region of interest is in-focus or whether the processing as discussed may be repeated to adaptively move the lens to a new position until focus is determined Such an iterative process may be repeated until focus is found for example.

Figure 8:
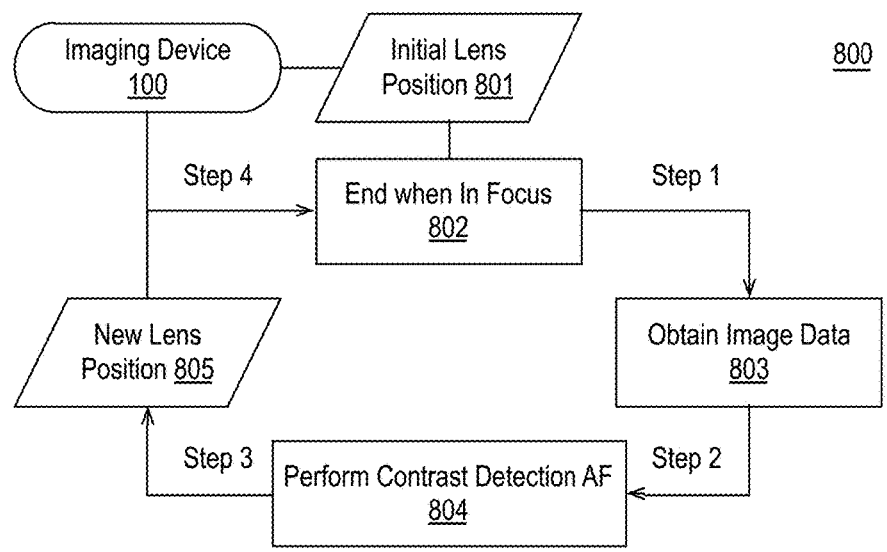
FIG. 8 illustrates a block diagram of an example contrast detection autofocus convergence loop.

FIG. 8 illustrates a block diagram of an example contrast detection autofocus convergence loop 800, arranged in accordance with at least some implementations of the present disclosure. Convergence loop 800 may be implemented via imaging device 100 (as illustrated) and/or via contrast detection autofocus system 200. As shown in FIG. 8, imaging device 100 may have an initial lens position 801. To begin, imaging device 100 and/or contrast detection autofocus system 200 may determine a first lens movement. In some examples, imaging device 100 and/or contrast detection autofocus system 200 may determine the first lens movement based on a predetermined lens position movement. For example, imaging device 100 and/or contrast detection autofocus system 200 may move the lens as a percentage (e.g., 10% or 20%) of the available lens position range. In such examples, the first lens movement may be predetermined while subsequent lens position movements may be adaptive as discussed herein. It is noted that prior to the first lens position movement, imaging device 100 and/or contrast detection autofocus system 200 may determine a first response, a second response, a ratio, and a lens position for subsequent use in determining changes in such values (e.g., deltas) as discussed herein. With respect to a subsequent lens position such values may be labeled as previous for example. In other examples, the first lens movement may be adaptive based on the determined first response, second response, ratio, and/or lens position. For example, the adaptive first lens position movement may be determined as discussed herein with respect to Equation (1) although delta values may not be available.

Furthermore, as shown, imaging device 100 may repeat steps 1-4 until focus is found. In some examples, the initial lens position 801 may be in an in-focus position and no further processing may be needed. In other examples such that the lens is in an out of focus position or improved focus is desired, convergence loop 800 may continue. For example, convergence loop may continue at determination operation 802, "End when In Focus", where imaging device 100 and/or contrast detection autofocus system 200 may end convergence loop 800 when a determination is made that imaging device 100 is in focus. In some examples, the determination of whether imaging device 100 and/or contrast detection autofocus system 200 is in focus may be based on an evaluation of the discussed parameters as discussed with respect to example regions 707-710 of chart 700. For example, if a ratio change is positive and the first response change and/or the second response change is positive, the imaging device may be determined to be out of focus (e.g. as discussed with respect to region 707). In another example, if a ratio change is positive and the first response change and/or the second response change is positive, the imaging device may be determined to be within an in-focus range (e.g. as discussed with respect to region 708). Similarly, whether the imaging device is in or out of focus may be determined as discussed with respect to region 708, region 710 or elsewhere herein. At step 1, imaging device 100 may perform operation 803, "Obtain Image Data". For example, imaging device 100 may obtain image data via sensor 201 as discussed herein. At step 2, imaging device 100 may perform operation 804, "Perform Contrast Detection Autofocus" to determine a new lens position 805. For example, imaging device 100 and/or contrast detection autofocus system 200 may perform contrast detection autofocus based on techniques discussed with respect to contrast detection autofocus system 200. Convergence loop 800 may continue as discussed based on new lens position 805 until a imaging device 100 is deemed to be in focus at determination operation 802 (or some other operation interrupts convergence loop 800).

Figure 9:
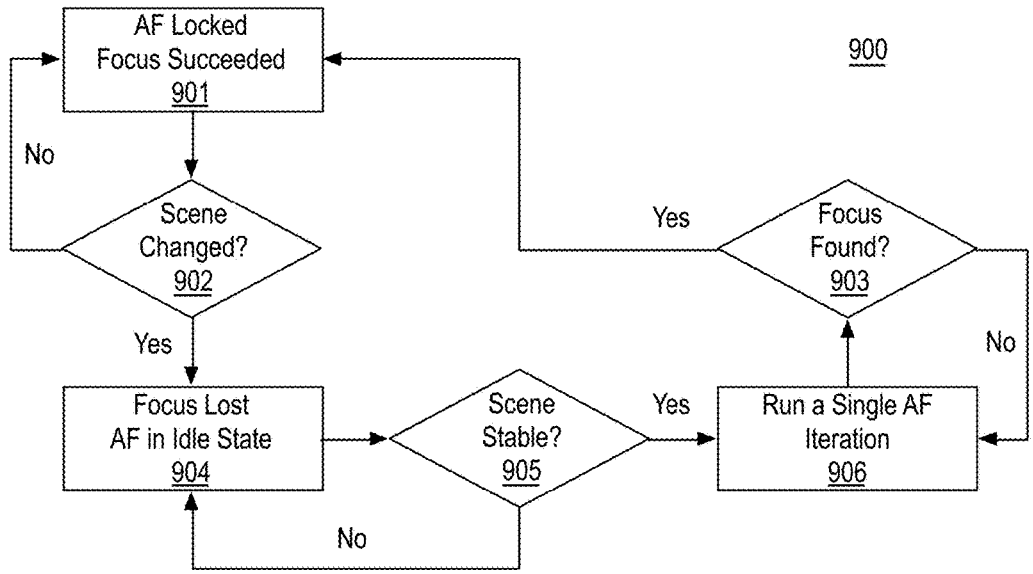
FIG. 9 illustrates a block diagram of an example contrast detection autofocus state machine.

FIG. 9 illustrates a block diagram of an example contrast detection autofocus state machine 900, arranged in accordance with at least some implementations of the present disclosure. State machine 900 may be implemented via imaging device 100 and/or via contrast detection autofocus system 200. As shown in FIG. 9, if state machine 900 is at state 901, "AF Locked Focus Succeeded", no other autofocus operations may be performed until a scene change or other instance requiring focus (e.g., a user request or the like occurs) as is shown with respect to decision state 902, "Scene Changed?". If no such change has occurred, state machine 900 may remain at state 901. If a change has occurred, state machine 900 may move to state 904, "Focus Lost AF in Idle State", where state machine 900 may be in an out of focus state with the autofocus in an idle state. State machine 900 may move to decision state 905, "Scene Stable?", where state machine 900 may determine whether the current scene (e.g., scene 300 or the like) is stable. If the scene is not stable, state machine 900 may remain at state 904. If the scene is or becomes stable, state machine 900 may move to state 906, "Run a Single Autofocus (AF) Iteration," where a single autofocus iteration may be run. For example, a single autofocus iteration may include determining a first filer response, second filter response, filter response ratio, associated deltas, determining a distance from focus and confidence level, generating a step size and direction, and moving to a new lens position as discussed herein. As shown, after the single autofocus iteration and search have completed as indicated if the lens position change does not provide focus as shown with respect to decision state 903, "Focus Found?", state machine 900 may return or remain at state 906 where another autofocus iteration may be implemented and, if focus is found, state machine 900 may move to state 901 (as already discussed).

The techniques discussed herein may allow, in some examples, for fast and reliable contrast detection autofocus using multi-filter processing and adaptive step size selection. Such techniques may provide fast autofocus and little or no overshoot. Furthermore, such techniques may be inexpensive to implement (e.g., not requiring phase sensors or image sensors with phase autofocus pixels) and such techniques may be suitable to a wide range of scenes and in all conditions hybrid phase and contrast based autofocus. As such, the techniques discussed herein may provide improved image quality and improved video quality in imaging devices.

Figure 10:
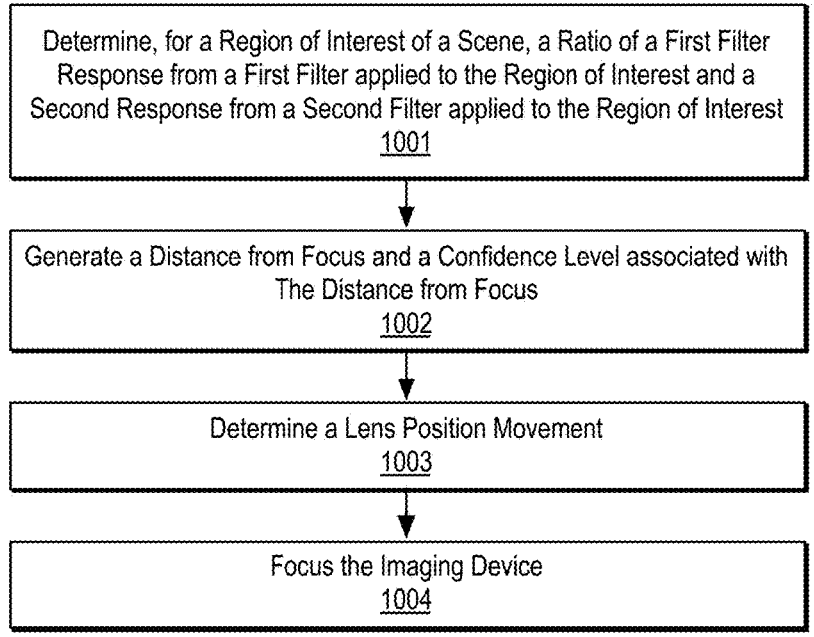
FIG. 10 is a flow diagram illustrating an example process for providing contrast detection autofocus.

FIG. 10 is a flow diagram illustrating an example process 1000 for providing contrast detection autofocus, arranged in accordance with at least some implementations of the present disclosure. Process 1000 may include one or more operations 1001-1004 as illustrated in FIG. 10. Process 1000 may form at least part of an autofocus process. By way of non-limiting example, process 1000 may form at least part of an autofocus process for imaging device 100 and/or as implemented via contrast detection autofocus system 200 as discussed herein. Furthermore, process 1000 will be described herein with reference to system 1100 of FIG. 11.

Figure 11:
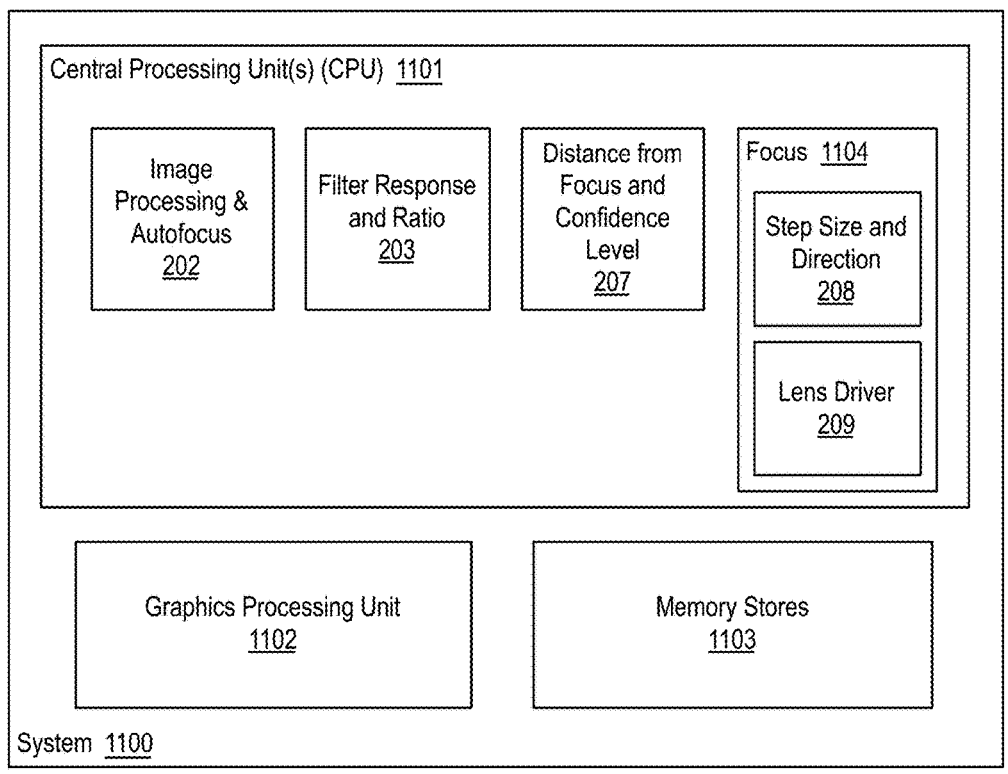
FIG. 11 is an illustrative diagram of an example system for providing contrast detection autofocus.

FIG. 11 is an illustrative diagram of an example system 1100 for providing contrast detection autofocus, arranged in accordance with at least some implementations of the present disclosure. As shown in FIG. 11, system 1100 may include one or more central processing units (CPU) 1101, a graphics processing unit (GPU) 1102, and memory stores 1103. Also as shown, CPU 1101 may include image processing and autofocus module 202, filter response and ratio module 203, distance from focus and confidence level module 207, and focus module 1104. As shown, focus module 1104 may include or implement step size and direction module 208 and/or lens driver 209. In the example of system 1100, memory stores 1103 may store image data or content such as captured images (or image frames) (e.g., images, frames, region(s) of interest or portions of images) or image related data such as image data generated via an imaging pipeline and/or system or modules such as filter responses, ratios, filter response deltas, ratio deltas, or th like.

As shown, in some examples, image processing and autofocus module 202, filter response and ratio module 203, distance from focus and confidence level module 207, and focus module 11045 may be implemented via central processing units 1101. In other examples, one or more of image processing and autofocus module 202, filter response and ratio module 203, distance from focus and confidence level module 207, and focus module 1104 may be implemented via graphics processing unit 1102. In other examples, one or more of image processing and autofocus module 202, filter response and ratio module 203, distance from focus and confidence level module 207, and focus module 1104 may be implemented via an imaging pipeline and/or image signal processor or the like. Furthermore, system 1100 may include sensor 201 or any other module or device as discussed herein implemented via central processing units 1101 and/or graphics processing units 1102.

Graphics processing unit 1102 may include any number and type of graphics processing units that may provide the operations as discussed herein. Such operations may be implemented via software or hardware or a combination thereof. For example, graphics processing unit 1102 may include circuitry dedicated to manipulate images obtained from memory stores 1103. Central processing units 1101 may include any number and type of processing units or modules that may provide control and other high level functions for system 1100 and/or provide any operations as discussed herein. Memory stores 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1103 may be implemented by cache memory. In an embodiment, one or more of image processing and autofocus module 202, filter response and ratio module 203, distance from focus and confidence level module 207, and focus module 1104 (or other modules discussed herein) may be implemented via an execution unit (EU) of graphics processing unit 1102. The EU may include, for example, programmable logic or circuitry such as a logic core or cores that may provide a wide array of programmable logic functions. In an embodiment, one or more of image processing and autofocus module 202, filter response and ratio module 203, distance from focus and confidence level module 207, and focus module 1104 (or other modules discussed herein) may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 10, process 1000 may begin at operation 1001, "Determine, for a Region of Interest of a Scene, a Ratio of a First Filter Response from a First Filter applied to the Region of Interest and a Second Response from a Second Filter applied to the Region of Interest", where, for a region of interest of a scene within view of an imaging device, a ratio of a first filter response form a first filter applied to the region of interest and a second response form a second filter applied to the region of interest may be determined. For example, filter response and ratio module 203 as implemented via CPU 1101 or other circuitry may determine first response 212, second response 213, and ratio 214. For example, the applied filters may be band pass filters with one filter having a wider pass band than the other and the responses may be focus values or sharpness values or the like.

Processing may continue at operation 1002, "Generate a Distance from Focus and a Confidence Level associated with The Distance from Focus", where a distance from focus and a confidence level associated with the distance from focus may be generated. For example, distance from focus and confidence level module 207 as implemented via CPU 1101 or other circuitry may generate distance from focus and confidence level 215. For example, distance from focus and confidence level module 207 may generate a distance from focus based at least in part on ratio 214. In some examples, the distance from focus may be based on ratio 214, first response 212, second response 213, and a ratio change from a previous ratio to ratio 214 (e.g., $\Delta R$). In some examples, the distance from focus may be based on ratio 214, first response 212, a first response change from a previous first response to first response 212 (e.g., $\Delta F_1$), second response 213, a second response change from a previous second response to second response 213 (e.g., $\Delta F_2$), a ratio change from a previous ratio to ratio 214 (e.g., $\Delta R$). Furthermore, in some examples, the confidence level may be based on a filter response (e.g., the first filter response), a filter response change (e.g., a change in the first filter response), and ratio 214.

Processing may continue at operation 1003, "Determine a Lens Position Movement", where a lens position movement may be determined based at least in part on the distance from focus and the confidence level. For example, focus module 1104 as implemented via CPU 1101 or other circuitry may determine the lens position movement. In some examples, step size and direction module 208 as implemented via focus module 1104 may determine a step size and direction by adaptively generating a multiplier (e.g., k) based on the distance from focus, the confidence level, and a current lens position and determining a product of the multiplier and a reference step size (e.g. $s_{ref}$) as discussed herein with respect to Equation (3). Based on the step size, lens driver 209 may determine the lens position movement to drive a lens to a new position for example.

Processing may continue at operation 1004, "Focus the Imaging Device", where the imaging device may be focused based at least in part on the lens position movement. For example, focus module 1104 as implemented via CPU 1101 or other circuitry may focus the imaging device by driving a lens to a new position based on the lens position movement. In some examples, such movement may focus the imaging device. In other examples, the imaging device may repeat one or more of the discussed operations to achieve focus as discussed herein with respect to convergence loop 800 and/or state machine 900.

Process 1000 may be repeated any number of times either in series or in parallel for any number of exposures implemented via a user of imaging device 100 or the like. Furthermore, process 1000 may be repeated any number of times during a single exposure implemented via a user of imaging device 100. For example, after providing autofocus based on process 1000, imaging device 100 may repeat process 1000 from the new lens position to attain even better focus or as the scene or objects therein may have changed. For example, such processes may be performed substantially continuously until a user has taken the exposure. As discussed, process 1000 may provide fast and reliable contrast detection autofocus with little or no overshoot in a wide range of conditions. Such autofocus may provide for improved autofocus capabilities for users of imaging device 100.

Various components of the systems described herein may be implemented in software, firmware, and/or hardware and/or any combination thereof. For example, various components of imaging device 100, system 200, system 1100, or device 1200 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of imaging device 100, system 200, system 1100, or device 1200, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
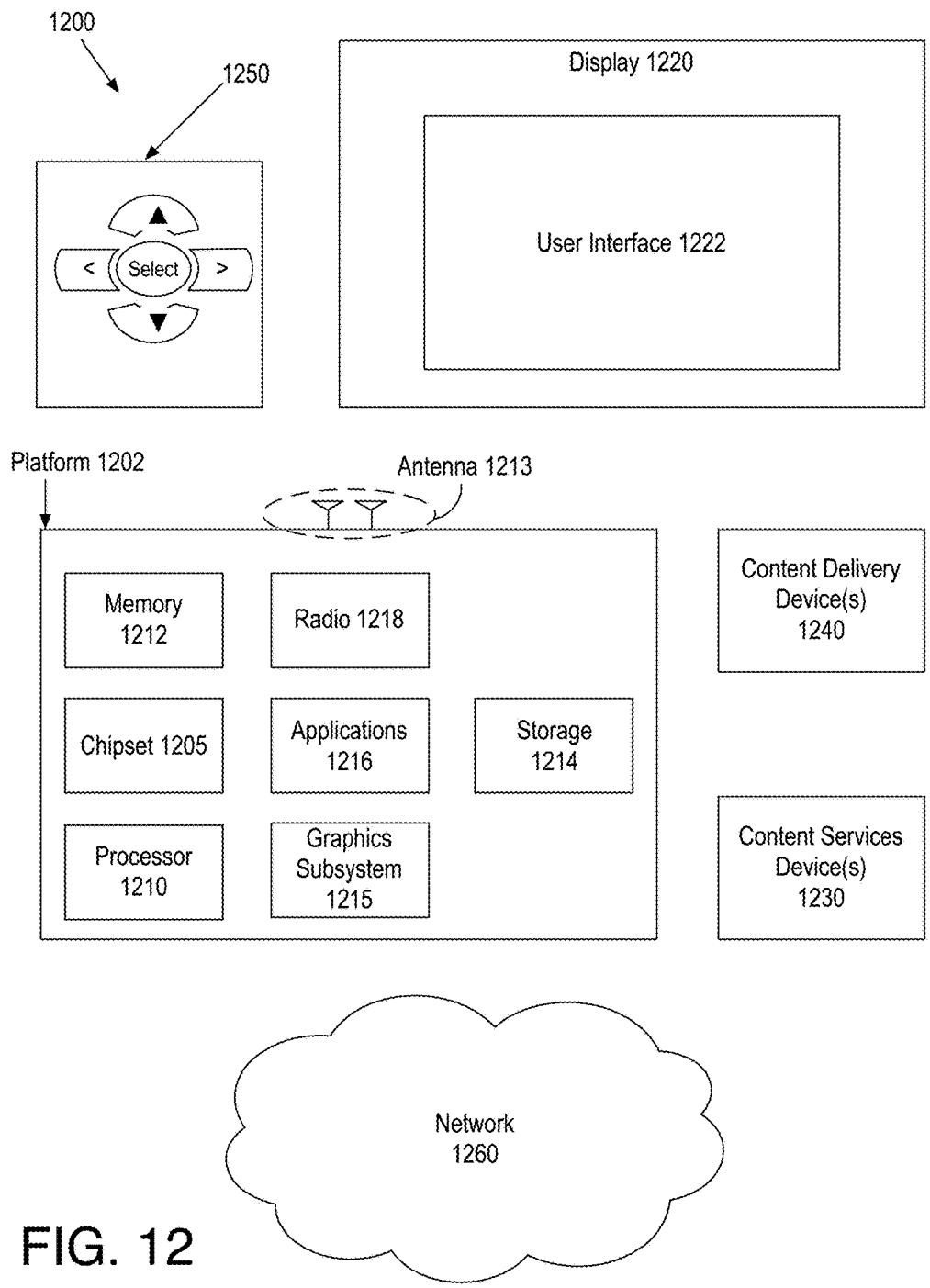
FIG. 12 is an illustrative diagram of an example system.

FIG. 12 is an illustrative diagram of an example system 1200, arranged in accordance with at least some implementations of the present disclosure. In various implementations, system 1200 may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
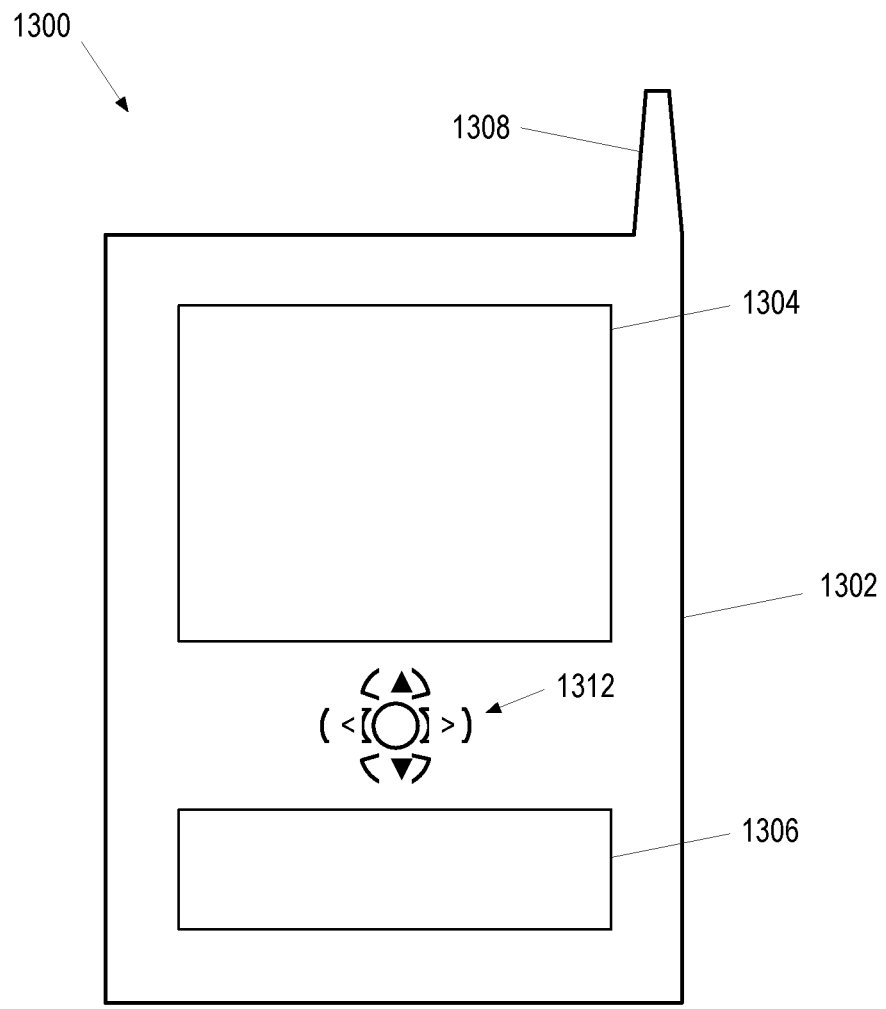
FIG. 13 illustrates an example device, all arranged in accordance with at least some implementations of the present disclosure.

As described above, system 1200 may be embodied in varying physical styles or form factors. FIG. 13 illustrates implementations of a small form factor device 1300 in which system 1200 may be embodied. In various embodiments, for example, device 1300 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing 1302, a display 1304, an input/output (I/O) device 1306, and an antenna 1308. Device 1300 also may include navigation features 1312. Display 1304 may include any suitable display unit for displaying information appropriate for a mobile computing device. I/O device 1306 may include any suitable I/O device for entering information into a mobile computing device. Examples for I/O device 1306 may include an alphanumeric keyboard, a numeric keypad, a touch pad, input keys, buttons, switches, rocker switches, microphones, speakers, voice recognition device and software, and so forth. Information also may be entered into device 1300 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for providing contrast detection autofocus for an imaging device comprises determining, for a region of interest of a scene, a ratio of a first response from a first filter applied to the region of interest and a second response from a second filter applied to the region of interest, generating a distance from focus and a confidence level associated with the distance from focus, wherein the distance from focus is based at least in part on the ratio, determining a lens position movement based at least in part on the distance from focus and the confidence level, and focusing the imaging device based at least in part on the lens position movement.

Further to the first embodiments, the first filter and the second filter comprise band pass filters, and wherein the first filter has a wider pass band than the second filter.

Further to the first embodiments, the first response comprises at least one of a focus value, a contrast value, or a sharpness value.

Further to the first embodiments, the first filter and the second filter comprise band pass filters and the first filter has a wider pass band than the second filter and/or wherein the first response comprises at least one of a focus value, a contrast value, or a sharpness value.

Further to the first embodiments, the distance from focus is further based on the first response, the second response, and a ratio change from a previous ratio to the ratio.

Further to the first embodiments, the distance from focus is further based on the first response, a first response change from a previous first response to the first response, the second response, a second response change from a previous second response to the second response, and a ratio change from a previous ratio to the ratio.

Further to the first embodiments, the distance from focus is further based on the first response, a first response change from a previous first response to the first response, the second response, a second response change from a previous second response to the second response, and a ratio change from a previous ratio to the ratio, wherein the ratio change is positive, the first response change is positive, the imaging device is determined to be out of focus, and the distance from focus is further based on a reference change in lens position.

Further to the first embodiments, the distance from focus is further based on the first response, a first response change from a previous first response to the first response, the second response, a second response change from a previous second response to the second response, and a ratio change from a previous ratio to the ratio, wherein the ratio change is positive, the first response change is positive, the imaging device is determined to be out of focus, and the distance from focus is further based on a reference change in lens position, wherein the confidence level is proportional to the ratio change and the first response change.

Further to the first embodiments, the distance from focus is further based on the first response, a first response change from a previous first response to the first response, the second response, a second response change from a previous second response to the second response, and a ratio change from a previous ratio to the ratio, wherein the ratio change is positive, the first response change is negative, the imaging device is determined to be within an in-focus range, and the distance from focus is further based on a change in lens position and a reference change in lens position.

Further to the first embodiments, the confidence level is based on the first response, a first response change from a previous first response to the first response, and the ratio.

Further to the first embodiments, determining the lens position movement comprises adaptively generating a multiplier based on the distance from focus, the confidence level, and a current lens position and determining a product of the multiplier and a reference step size.

Further to the first embodiments, the method further comprises determining a previous ratio of a previous first response from the first filter applied to the region of interest and a previous second response from the second filter applied to the region of interest and moving a lens of the imaging device based on a predetermined lens position movement to a lens position associated with the ratio of the first response and the second response.

Further to the first embodiments, the method further comprises determining a previous ratio of a previous first response from the first filter applied to the region of interest and a previous second response from the second filter applied to the region of interest, determining a previous lens position movement based at least in part on the previous ratio, the previous first response, and the previous second response, and moving a lens of the imaging device based on the previous lens position movement.

In one or more second embodiments, a system for providing contrast detection autofocus for an imaging device comprises a memory configured to store image data and a central processing unit coupled to the memory, wherein the central processing unit comprises filter response and ratio circuitry configured to determine, for a region of interest of a scene, a ratio of a first response from a first filter applied to the region of interest and a second response from a second filter applied to the region of interest, distance from focus and confidence level circuitry configured to generate a distance from focus and a confidence level associated with the distance from focus, wherein the distance from focus is based at least in part on the ratio, and focus circuitry configured to determine a lens position movement based at least in part on the distance from focus and the confidence level and focus the imaging device based at least in part on the lens position movement.

Further to the second embodiments, the first filter and the second filter comprise band pass filters, and wherein the first filter has a wider pass band than the second filter.

Further to the second embodiments, the first response comprises at least one of a focus value, a contrast value, or a sharpness value.

Further to the second embodiments, the distance from focus is further based on the first response, the second response, and a ratio change from a previous ratio to the ratio.

Further to the second embodiments, the distance from focus is further based on the first response, a first response change from a previous first response to the first response, the second response, a second response change from a previous second response to the second response, and a ratio change from a previous ratio to the ratio.

Further to the second embodiments, the distance from focus is further based on the first response, a first response change from a previous first response to the first response, the second response, a second response change from a previous second response to the second response, and a ratio change from a previous ratio to the ratio, wherein the ratio change is positive, the first response change is positive, the imaging device is determined to be out of focus, and the distance from focus is further based on a reference change in lens position.

Further to the second embodiments, the distance from focus is further based on the first response, a first response change from a previous first response to the first response, the second response, a second response change from a previous second response to the second response, and a ratio change from a previous ratio to the ratio, wherein the ratio change is positive, the first response change is positive, the imaging device is determined to be out of focus, and the distance from focus is further based on a reference change in lens position.

Further to the second embodiments, the confidence level is based on the first response, a first response change from a previous first response to the first response, and the ratio.

Further to the second embodiments, the focus circuitry being configured to determine the lens position movement comprises the focus circuitry being configured to adaptively generate a multiplier based on the distance from focus, the confidence level, and a current lens position and determine a product of the multiplier and a reference step size.

Further to the second embodiments, the filter response and ratio circuitry is further configured to determine a previous ratio of a previous first response from the first filter applied to the region of interest and a previous second response from the second filter applied to the region of interest, and wherein the focus circuitry is further configured to move a lens of the imaging device based on a predetermined lens position movement to a lens position associated with the ratio of the first response and the second response.

Further to the second embodiments, the filter response and ratio circuitry is further configured to determine a previous ratio of a previous first response from the first filter applied to the region of interest and a previous second response from the second filter applied to the region of interest, and wherein the focus circuitry is further configured to determine a previous lens position movement based at least in part on the previous ratio, the previous first response, and the previous second response and move a lens of the imaging device based on the previous lens position movement.

In one or more third embodiments, a system for providing contrast detection autofocus for an imaging device comprises means for determining, for a region of interest of a scene, a ratio of a first response from a first filter applied to the region of interest and a second response from a second filter applied to the region of interest, means for generating a distance from focus and a confidence level associated with the distance from focus, wherein the distance from focus is based at least in part on the ratio, means for determining a lens position movement based at least in part on the distance from focus and the confidence level, and means for focusing the imaging device based at least in part on the lens position movement.

Further to the third embodiments, the distance from focus is further based on the first response, a first response change from a previous first response to the first response, the second response, a second response change from a previous second response to the second response, and a ratio change from a previous ratio to the ratio.

Further to the third embodiments, the distance from focus is further based on the first response, a first response change from a previous first response to the first response, the second response, a second response change from a previous second response to the second response, and a ratio change from a previous ratio to the ratio, wherein the ratio change is positive, the first response change is positive, the imaging device is determined to be out of focus, and the distance from focus is further based on a reference change in lens position.

In one or more fourth embodiments, at least one machine readable medium comprises a plurality of instructions that in response to being executed on an imaging device, cause the imaging device to provide contrast detection autofocus by determining, for a region of interest of a scene, a ratio of a first response from a first filter applied to the region of interest and a second response from a second filter applied to the region of interest, generating a distance from focus and a confidence level associated with the distance from focus, wherein the distance from focus is based at least in part on the ratio, determining a lens position movement based at least in part on the distance from focus and the confidence level, and focusing the imaging device based at least in part on the lens position movement.

Further to the fourth embodiments, the distance from focus is further based on the first response, a first response change from a previous first response to the first response, the second response, a second response change from a previous second response to the second response, and a ratio change from a previous ratio to the ratio.

Further to the fourth embodiments, the distance from focus is further based on the first response, a first response change from a previous first response to the first response, the second response, a second response change from a previous second response to the second response, and a ratio change from a previous ratio to the ratio, wherein the ratio change is positive, the first response change is positive, the imaging device is determined to be out of focus, and the distance from focus is further based on a reference change in lens position.

Further to the fourth embodiments, the distance from focus is further based on the first response, a first response change from a previous first response to the first response, the second response, a second response change from a previous second response to the second response, and a ratio change from a previous ratio to the ratio, wherein the ratio change is positive, the first response change is positive, the imaging device is determined to be out of focus, and the distance from focus is further based on a reference change in lens position, wherein the confidence level is proportional to the ratio change and the first response change.

Further to the fourth embodiments, the distance from focus is further based on the first response, a first response change from a previous first response to the first response, the second response, a second response change from a previous second response to the second response, and a ratio change from a previous ratio to the ratio, wherein the ratio change is positive, the first response change is negative, the imaging device is determined to be within an in-focus range, and the distance from focus is further based on a change in lens position and a reference change in lens position.

Further to the fourth embodiments, the machine readable medium further comprises instructions that cause the imaging device to provide contrast detection autofocus by adaptively generating a multiplier based on the distance from focus, the confidence level, and a current lens position and determining a product of the multiplier and a reference step size.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for providing contrast detection autofocus for an imaging device comprising:
   determining, for a region of interest of a scene, a ratio of a first response from a first filter applied to the region of interest and a second response from a second filter applied to the region of interest, wherein the first filter and the second filter comprise band pass filters, the first filter has a wider pass band than the second filter, and the first and second filters are both applied only to image data associated with the region of interest;
   generating a distance from focus and a confidence level associated with the distance from focus, wherein the distance from focus is based at least in part on the ratio;

determining a lens position movement based at least in part on the distance from focus and the confidence level, wherein determining the lens position movement comprises adaptively generating a multiplier based on the distance from focus, the confidence level, and a current lens position and determining a product of the multiplier and a reference step size; and focusing the imaging device based at least in part on the lens position movement.

2. The method of claim 1, wherein the first response comprises at least one of a focus value, a contrast value, or a sharpness value.

3. The method of claim 1, wherein the distance from focus is further based on the first response, the second response, and a ratio change from a previous ratio to the ratio.

4. The method of claim 1, wherein the distance from focus is further based on the first response, a first response change from a previous first response to the first response, the second response, a second response change from a previous second response to the second response, and a ratio change from a previous ratio to the ratio.

5. The method of claim 4, further comprising:
determining the imaging device is out of focus in response to the ratio change being positive and the first response change being positive, wherein the distance from focus is further based on a reference change in lens position.

6. The method of claim 5, wherein the confidence level is proportional to the ratio change and the first response change.

7. The method of claim 4, further comprising:
determining the imaging device is within an in-focus range in response to the ratio change being positive and the first response change being negative, wherein the distance from focus is further based on a change in lens position and a reference change in lens position.

8. The method of claim 1, wherein the confidence level is based on the first response, a first response change from a previous first response to the first response, and the ratio.

9. The method of claim 1, further comprising:
determining a previous ratio of a previous first response from the first filter applied to the region of interest and a previous second response from the second filter applied to the region of interest; and
moving a lens of the imaging device based on a predetermined lens position movement to a lens position associated with the ratio of the first response and the second response.

10. The method of claim 1, further comprising:
determining a previous ratio of a previous first response from the first filter applied to the region of interest and a previous second response from the second filter applied to the region of interest;
determining a previous lens position movement based at least in part on the previous ratio, the previous first response, and the previous second response; and
moving a lens of the imaging device based on the previous lens position movement.

11. A system for providing contrast detection autofocus for an imaging device, comprising:
a memory configured to store image data; and
a central processing unit coupled to the memory, the central processing unit to:
determine, for a region of interest of a scene, a ratio of a first response from a first filter applied to the region of interest and a second response from a second filter applied to the region of interest, wherein the first filter and the second filter comprise band pass filters, the first filter has a wider pass band than the second filter, and the first and second filters are both applied only to image data associated with the region of interest;
generate a distance from focus and a confidence level associated with the distance from focus, wherein the distance from focus is based at least in part on the ratio; and
determine a lens position movement based at least in part on the distance from focus and the confidence level, wherein to determine the lens position movement, the central processing unit is to adaptively generate a multiplier based on the distance from focus, the confidence level, and a current lens position and determine a product of the multiplier and a reference step size, and focus the imaging device based at least in part on the lens position movement.

12. The system of claim 11, wherein the distance from focus is further based on the first response, a first response change from a previous first response to the first response, the second response, a second response change from a previous second response to the second response, and a ratio change from a previous ratio to the ratio.

13. The system of claim 11, wherein the confidence level is based on the first response, a first response change from a previous first response to the first response, and the ratio.

14. The system of claim 11, wherein the central processing unit is further to determine a previous ratio of a previous first response from the first filter applied to the region of interest and a previous second response from the second filter applied to the region of interest, and wherein the system is to move a lens of the imaging device based on a predetermined lens position movement to a lens position associated with the ratio of the first response and the second response.

15. The system of claim 11, wherein the central processing unit is further to determine a previous ratio of a previous first response from the first filter applied to the region of interest and a previous second response from the second filter applied to the region of interest and to determine a previous lens position movement based at least in part on the previous ratio, the previous first response, and wherein the system is to move a lens of the imaging device based on the previous lens position movement.

16. At least one non-transitory machine readable medium comprising a plurality of instructions that in response to being executed on an imaging device, cause the imaging device to provide contrast detection autofocus by:
determining, for a region of interest of a scene, a ratio of a first response from a first filter applied to the region of interest and a second response from a second filter applied to the region of interest, wherein the first filter and the second filter comprise band pass filters, the first filter has a wider pass band than the second filter, and the first and second filters are both applied only to image data associated with the region of interest;
generating a distance from focus and a confidence level associated with the distance from focus, wherein the distance from focus is based at least in part on the ratio;
determining a lens position movement based at least in part on the distance from focus and the confidence level, wherein determining the lens position movement comprises adaptively generating a multiplier based on the distance from focus, the confidence level, and a current lens position and determining a product of the multiplier and a reference step size; and focusing the imaging device based at least in part on the lens position movement.

17. The machine readable medium of claim 16, wherein the distance from focus is further based on the first response, a first response change from a previous first response to the first response, the second response, a second response change from a previous second response to the second response, and a ratio change from a previous ratio to the ratio.

18. The machine readable medium of claim 17, further comprising instructions that cause the imaging device to provide contrast detection autofocus by:
   determining the imaging device is out of focus in response to the ratio change being positive and the first response change being positive, wherein the distance from focus is further based on a reference change in lens position.

19. The machine readable medium of claim 18, wherein the confidence level is proportional to the ratio change and the first response change.

20. The machine readable medium of claim 17, further comprising instructions that cause the imaging device to provide contrast detection autofocus by:
   determining the imaging device is within an in-focus range in response to the ratio change being positive and the first response change being negative, wherein the distance from focus is further based on a change in lens position and a reference change in lens position.

* * * * *